United States Patent
Denecker

(10) Patent No.: US 8,664,307 B2
(45) Date of Patent: *Mar. 4, 2014

(54) UV BARRIER FILM

(75) Inventor: Celine Denecker, Wigton (GB)

(73) Assignee: Innovia Films Limited, Wigton Cumbria (GB)

( * ) Notice: Subject to any disclaimer, the term of this patent is extended or adjusted under 35 U.S.C. 154(b) by 162 days.

This patent is subject to a terminal disclaimer.

(21) Appl. No.: 13/308,339

(22) Filed: Nov. 30, 2011

(65) Prior Publication Data

US 2012/0126186 A1    May 24, 2012

Related U.S. Application Data

(63) Continuation of application No. 12/670,356, filed as application No. PCT/GB2008/050596 on Jul. 18, 2008, now Pat. No. 8,088,848.

(30) Foreign Application Priority Data

Jul. 24, 2007    (GB) .................................. 0714418.1

(51) Int. Cl.
C08K 5/3492    (2006.01)
G02B 5/22    (2006.01)

(52) U.S. Cl.
USPC ............................................ 524/100; 252/589

(58) Field of Classification Search
USPC ........................................................... 524/100
See application file for complete search history.

(56) References Cited

U.S. PATENT DOCUMENTS

| | | |
|---|---|---|
| 395,243 A | 12/1888 | Maggi |
| 751,047 A | 2/1904 | Bircher |
| 2,605,897 A | 8/1952 | Rundle |
| D242,465 S | 11/1976 | Heldecker |
| 4,011,190 A | 3/1977 | Telkes |
| 4,157,784 A | 6/1979 | Grottrup et al. |
| D266,224 S | 9/1982 | Bronander, Jr. |
| 4,426,465 A | 1/1984 | Maki et al. |
| D276,566 S | 11/1984 | Yoshizawa |
| D276,567 S | 11/1984 | Yoshizawa |
| 4,565,738 A | 1/1986 | Purdy |
| 4,720,423 A | 1/1988 | Fraser |
| 4,836,438 A | 6/1989 | Rigby |
| 4,927,180 A | 5/1990 | Trundle et al. |
| 5,037,870 A | 8/1991 | Gugumus |
| 5,154,284 A | 10/1992 | Starkey |
| 5,174,492 A | 12/1992 | Gero |
| 5,180,762 A | 1/1993 | Canova |
| D339,063 S | 9/1993 | Simon |
| 5,249,676 A | 10/1993 | Ashcraft et al. |
| 5,358,792 A | 10/1994 | Mehta et al. |
| 5,443,915 A | 8/1995 | Wilkie et al. |
| 5,482,571 A | 1/1996 | Yamada |
| 5,482,780 A | 1/1996 | Wilkie et al. |
| 5,500,265 A | 3/1996 | Ambroise et al. |
| 5,643,676 A | 7/1997 | Dobashi et al. |
| 5,716,698 A | 2/1998 | Schreck et al. |
| 5,730,354 A | 3/1998 | O'Connor |
| 5,807,625 A | 9/1998 | Amon et al. |
| 5,924,571 A | 7/1999 | Cornelissen |
| 5,948,836 A | 9/1999 | Bonora |
| D427,369 S | 6/2000 | Bowen et al. |
| 6,117,438 A | 9/2000 | Topolkaraev et al. |
| 6,168,075 B1 | 1/2001 | Sagel |
| 6,223,895 B1 | 5/2001 | Bowen et al. |
| 6,231,975 B1 | 5/2001 | Kong et al. |
| 6,244,017 B1 | 6/2001 | Focke et al. |
| 6,248,442 B1 | 6/2001 | Kong et al. |
| D453,681 S | 2/2002 | Kursner |
| 6,451,426 B2 | 9/2002 | Kong et al. |
| 6,491,161 B1 | 12/2002 | Focke et al. |
| 6,511,728 B1 | 1/2003 | Bakos et al. |
| D491,313 S | 6/2004 | Schrott |
| 6,773,797 B1 | 8/2004 | Wang et al. |
| 6,815,482 B1 | 11/2004 | Hirn et al. |
| 6,916,867 B2 | 7/2005 | Gugumus |
| D541,471 S | 4/2007 | Mitten et al. |
| 7,207,155 B2 | 4/2007 | Draghetti et al. |
| D561,933 S | 2/2008 | Mitten et al. |
| 7,377,384 B2 | 5/2008 | Mitten et al. |
| D592,525 S | 5/2009 | Maude et al. |
| D592,526 S | 5/2009 | Maude et al. |
| D594,742 S | 6/2009 | Meier et al. |
| D601,435 S | 10/2009 | Fell et al. |
| D613,182 S | 4/2010 | Fell et al. |
| D619,477 S | 7/2010 | Frizell et al. |
| 2001/0031371 A1 | 10/2001 | Kong et al. |
| 2003/0047469 A1 | 3/2003 | Draghetti et al. |
| 2003/0134159 A1 | 7/2003 | Peet |
| 2003/0203231 A1 | 10/2003 | Stopper et al. |
| 2003/0226978 A1 | 12/2003 | Ribi et al. |
| 2004/0115457 A1 | 6/2004 | Kong |
| 2004/0115458 A1 | 6/2004 | Kong |

(Continued)

FOREIGN PATENT DOCUMENTS

DE    A-296 22 554    7/1997
EP    0099335 A1    1/1984

(Continued)

OTHER PUBLICATIONS

International Preliminary Report on Patentability in PCT Application No. PCT/GB2008/050596 dated Feb. 4, 2010 in 8 pages.

(Continued)

*Primary Examiner* — Hui Chin

(74) *Attorney, Agent, or Firm* — Knobbe, Martens, Olson & Bear, LLP

(57) ABSTRACT

Transparent polypropylene film comprising at least two UV-absorbing additives, a first additive being a non-aggregated inorganic material present in the film composition in an amount of from 0.1 to 5.0% by weight, and a second additive comprising an organic material selected from triazines, hindered amines, oxanilides, cyanoacrylates, benzotriazoles and/or benzophenones and present in the film in an amount of less than 2.0% by weight and wherein when both benzotriazole(s) and benzophenone(s) are present in the film, the ratio of benzotriazole(s) to benzophenone(s) is above 0.5.

12 Claims, 12 Drawing Sheets

(56) References Cited

U.S. PATENT DOCUMENTS

| | | |
|---|---|---|
| 2004/0166323 A1 | 8/2004 | Wang |
| 2005/0014431 A1 | 1/2005 | Carmody et al. |
| 2005/0150786 A1 | 7/2005 | Mitten et al. |
| 2005/0197481 A1 | 9/2005 | Temple et al. |
| 2005/0230960 A1 | 10/2005 | Bilodeau et al. |
| 2006/0023327 A1 | 2/2006 | Coombs et al. |
| 2006/0040091 A1 | 2/2006 | Bletsos et al. |
| 2006/0166023 A1* | 7/2006 | Yoshikata et al. ............ 428/523 |
| 2006/0278543 A1 | 12/2006 | Pham |
| 2007/0037465 A1 | 2/2007 | Nutz et al. |
| 2007/0221526 A1 | 9/2007 | Kikuchi |
| 2007/0228040 A1 | 10/2007 | Boriani et al. |
| 2007/0241002 A1 | 10/2007 | Wu et al. |
| 2010/0155292 A1 | 6/2010 | Fell et al. |
| 2010/0173145 A1 | 7/2010 | Marshall et al. |
| 2010/0189938 A1 | 7/2010 | Hewitt et al. |
| 2010/0237603 A1 | 9/2010 | Waning et al. |
| 2010/0247898 A1 | 9/2010 | Denecker |
| 2012/0318703 A1 | 12/2012 | Fell et al. |

FOREIGN PATENT DOCUMENTS

| | | |
|---|---|---|
| EP | 0290386 A2 | 11/1988 |
| EP | 0468923 A2 | 1/1992 |
| EP | 0746468 | 4/1996 |
| EP | 1004626 B1 | 5/2003 |
| EP | 1316419 A2 | 6/2003 |
| EP | 1413599 A1 | 4/2004 |
| EP | 1714778 A1 | 10/2006 |
| EP | 1749655 | 2/2007 |
| GB | 2236466 A | 4/1991 |
| GB | 2243578 A | 11/1991 |
| GB | 2349151 A | 10/2000 |
| GB | 2354245 A | 3/2001 |
| JP | 06297630 A | 10/1994 |
| WO | WO 90/06539 A | 6/1990 |
| WO | WO 96/04178 | 2/1996 |
| WO | WO 96/20085 | 7/1996 |
| WO | WO 98/22291 | 5/1998 |
| WO | WO 98/29311 | 7/1998 |
| WO | WO 98/32596 | 7/1998 |
| WO | WO 00/78545 | 12/2000 |
| WO | WO 02/100637 | 12/2002 |
| WO | WO 03/047857 | 6/2003 |
| WO | WO 2004/087795 A1 | 10/2004 |
| WO | WO 2005/072959 | 8/2005 |

OTHER PUBLICATIONS

International Search Report and Written Opinion in PCT Application No. PCT/GB2008/050596 dated Jan. 28, 2009 in 12 pages.
Search Report in GB application No. 0714418.1 dated Oct. 31, 2007 in 1 page.

* cited by examiner

UV BARRIER FILM

CROSS-REFERENCE TO RELATED APPLICATIONS

This application is a continuation of U.S. application Ser. No. 12/670,356, a U.S. National Phase under 35 U.S.C. §371 of International Application No. PCT/GB2008/050596, filed on Jul. 18, 2008 and published in English on Jan. 29, 2009, which claims foreign priority from GB 0714418.1, filed on Jul. 24, 2007, each of which are incorporated herein by reference in their entirety.

BACKGROUND

1. Field

The present invention concerns ultraviolet ("UV") barrier films, in particular polymeric films comprising a mixture of both inorganic and organic UV blocking compounds.

2. Description of the Related Art

UV barrier films are well known in the art. Thus, WO-A-04/87795 discloses a biaxially oriented polypropylene (BOPP) film which has dispersed therein rigid rod like UV absorbers compatible with the polymer such as (E,E)-1, 4-diphenylbuta-1,3-diene (DPBD); (E,E)-1,6-diphenylhexa-1,3,5-triene (DPHT); and beta, beta-carotene (carotene) at typical concentrations of about 0.01% w/w. These absorbers preferentially align along one of the two orientation axes of the film and allow anisotropy in the film to be covertly detected by the difference in the UV fluorescence spectra of the film in along each axis. This provides a covert means to authenticate the film, which is useful as a substrate for security applications.

EP-B-1004626 discloses a thin packaging film made out of a thermoplastic material with anti-UV properties, characterized in that its composition further comprises a combination of at least one organic compound with at least one inorganic UV-absorbent compound, for improved barrier against UV rays, and improved transparency. Preferably, the organic compound is a benzotriazole, and the inorganic compound is micronized zinc oxide. More preferably, the material for the film further comprises a binder compound, for example a benzophenone, in order to improve the compatibility between the organic component and the base-resin.

EP-A-160981 discloses a polymer composition which is used as a masterbatch comprising polyolefin and 10 to 80 wt-% nano scalar zinc oxide having a particle size between 1 and 100 nm. The invention further relates to a film made from this masterbatch and to a method for manufacturing said film.

U.S. Pat. No. 6,916,867 discloses polyolefin compositions which comprise as UV absorber a synergistic mixture of a) at least one hydroxybenzophenone and at least one 2-hydroxyphenylbenzotriazole with the proviso that the polyolefin is a high density polyethylene of the "Phillips" type or a polyethylene of the metallocene type; b) at least one hydroxybenzophenone and at least one 2-hydroxyphenyltriazine, with the proviso that if the polyolefin is polypropylene, no polyvinylpyridin is present c) at least one hydroxybenzophenone and at least one oxanilide; d) at least one 2-hydroxyphenylbenzotriazole and at least one oxanilide; e) at least one 2-hydroxyphenyltriazine and at least one oxanilide; f) at least one hydroxybenzophenone, at least one 2-hydroxyphenylbenzotriazole and at least one oxanilide; g) at least one hydroxybenzophenone, at least one oxanilide and at least one 2-hydroxyphenyltriazine; or h) at least one 2-hydroxyphenylbenzotriazole, at least one oxanilide and at least one 2-hydroxy phenyltriazine.

SUMMARY

According to embodiments of the present invention there is provided a transparent polypropylene film comprising at least two UV-absorbing additives, a first additive being a non-aggregated inorganic material present in the film composition in an amount of from 0.1% to 5.0% by weight, and a second additive comprising an organic material selected from triazines, hindered amines, oxanilides, cyanoacrylates, benzotriazoles and/or benzophenones and present in the film in an amount of less than 2.0% by weight and wherein when both benzotriazole(s) and benzophenone(s) are present in the film, the ratio of benzotriazole(s) to benzophenone(s) is greater than 0.5.

The inorganic additive is preferably selected from one or more mineral oxides such as metal oxides, for example from non-aggregated zinc and/or titanium oxides. The mean particle size of the inorganic additive is preferably <200 nm, more preferably <100 nm, more preferably <75 nm, still more preferably <50 nm and most preferably <40 nm. Non-aggregation of the inorganic additive can be achieved by means known in the art, such as coating, dispersion, etc.

Although it has previously been contemplated to use a combination of inorganic and organic UV-blockers in a polymeric film, the film of the invention realises a significant advantage in optical properties, and by careful selection of the relative quantities of the respective additives, it has been found possible to formulate the film composition without the aid of a binder to solubilise the organic component.

One problem with organic UV absorbers is their tendency to bloom or migrate to the film surface over time, causing a deterioration in the optical properties of the film. We have found that in a polypropylene film the problem of migration of organic additives such as triazines, hindered amines, oxanilides, cyanoacrylates, benzotriazoles and/or benzophenones can largely be avoided by limiting the quantity of such additive in the film to below 2.0%, preferably below 1.5%, more preferably below 1.0% and most preferably below 0.75% by weight of the film composition.

However, at such levels of organic additive, we have found that the films can be insufficiently UV absorbing for certain applications.

One problem with inorganic UV absorbers is their tendency to cause a hazy appearance in the film, probably because of the particulate nature of such additives, which may have particle sizes effective to disperse visible light, or which may agglomerate in the film to do so. We have found that in a polypropylene film the problem of haze can largely be avoided by selected a non-aggregated additive and by limiting the quantity of such additive in the film to below 5.0%, preferably below 4.5%, more preferably below 4.0% and most preferably below 3.5% by weight of the film composition. We have found for example that satisfactory properties can be achieved with loadings of from 0.1% by weight to 3.0% by weight active inorganic additive, for example.

We have found the stated combination of inorganic and organic UV blocking additives provides a polypropylene film which exhibits excellent optical properties and yet is substantially UV blocking, to the extent that at the point of maximum transmittance of UV light between 220 and 350 nm the film transmits no more that 30%, preferably no more than 25%, more preferably no more than 20% and most preferably no more than 15% of the UV light incident upon the film at the wavelength of the said maximum transmittance.

Moreover, we have found that satisfactory optical properties with respect to the migration of the organic additive can be realised without including in the film a binder therefor. When both benzotriazole and benzophenone are present in the film, we have found that the benzophenone acts as a UV absorber in its own right, not as a binder for the benzotriazole. When both components are present, the benzophenone is in any event present in insufficient quantity with respect to the benzotriazole to act as a binder therefor, the ratio of benzotriazole to benzophenone in the film composition being greater than 0.5, preferably at least 1, more preferably at least 1.5 and most preferably at least about 2.

The film of the invention preferably exhibits wide angle haze (WAH) of less than 10%, more preferably less than 8% and most preferably less than 6%.

The film of the invention preferably exhibits gloss of greater than 80%, more preferably greater than 85% and most preferably greater than 90%.

The film may be a multilayer structure formed by any suitable method (such as co-extrusion and/or lamination) with one or more core or surface layers being formed as described herein.

In one embodiment of the invention the film comprises biaxially oriented polypropylene (BOPP). The BOPP films may be prepared with substantially balanced physical properties, for example as can be produced using substantially equal machine direction and transverse direction stretch ratios, or can be unbalanced where the film is significantly more oriented in one direction (MD or TD). Sequential stretching can be used, in which heated rollers effect stretching of the film in the machine direction and a stenter over is thereafter used to effect stretching in the transverse direction, or simultaneous stretching, for example using the so-called bubble process. The machine direction and transverse direction stretch ratios are preferably in the range of from 4:1 to 10:1, and more preferably from 6:1 to 8:1.

Many suitable benzotriazoles may be contemplated for use in the present invention, of which 2-(2'-hydroxy-3',5'-di-t-amylphenyl) benzotriazole available under the trade name Cyasorb UV-2337 from Cytec Industries Inc. and under the trade name Lowilite 28 from Great Lakes Chemical Corporation and phenol, 2-(5-chloro-2H-benzotriazole-2-yl)-6-(1,1-dimethylethyl)-4-methyl available under the trade name Tinuvin 326 and 2-(2H-benzotriazol-2-yl)-4,6-bis(1-methyl-1-phenylethyl)phenol available under the trade name Tinuvin 234 from Ciba Specialty Chemicals Inc. may be mentioned as examples.

Many suitable benzophenones may be contemplated for use in the present invention; of which methanone, 2-hydroxy-4-(octyloxy)-phenyl available under the trade name Chimassorb 81 from Ciba Specialty Chemicals Inc. and 2-[4,6-bis(2,4-dimethylphenyl)-1,3,5-triazin-2-yl]-5-(octyloxy)phenol available under the trade name Cyasorb UV-1164 from Cytec Industries Inc. may be mentioned as examples.

Many suitable combinations of benzotriazole(s) and benzophenone(s) may be contemplated for use in the present invention, of which Shelfplus UV 1400 available from Ciba Specialty Chemicals Inc. may be mentioned as an example.

Commercially available materials may also comprise a blend of one or more organic UV absorbers, together with one or more inorganic UV absorbers, of which Shelfplus UV 1400 is also an example.

Amongst inorganic UV absorbers may be mentioned micronised metal oxides such as zinc and titanium oxides, and mixtures thereof. Suitable zinc oxide UV additives are commercially available for example under the trade name Bayoxide from Borchers GmbH.

Other suitable inorganic UV absorbers include a polypropylene masterbatch containing 10% mineral oxide available under the designation UVBLOCK10 from Ampacet.

The film core or the skin layers of the film may comprise additional materials such as anti-block additives, opacifiers, fillers, cross-linkers, colourants, waxes and the like.

The film may be further treated, by coroner discharge treating for example, to improve ink receptivity of the film or of the skin layer of the film.

The films used in accordance with the present invention can be of a variety of thicknesses according to the application requirements. For example they can be from about 10 to about 240 microns thick, and preferably from about 20 to about 60 microns thick.

In the case where the film is a multilayer film having one or more skin layers, the skin layers preferably have a thickness of from about 0.05 microns to about 2 microns, preferably from about 0.1 microns to about 1.5 microns, more preferably from about 0.2 microns to about 1.25 microns, most preferably from about 0.3 microns to about 0.9 microns.

BRIEF DESCRIPTION OF THE DRAWINGS

Embodiments of the invention will now be more particularly described with reference to the following Examples. The UV spectra mentioned in the Examples are shown in the Figures, in which.

DETAILED DESCRIPTION

In the following Examples the UV blocking additives which were used were as follows:

Organic Additives:
Tinuvin 234 (member of the benzotriazole family, namely 2-(2H-benzotriazol-2-yl)-4,6-bis(1-methyl-1-phenylethyl) phenol from Ciba Specialty Chemicals Inorganic Additives:
Mineral oxide in PP called UVBLOCK10 (an inorganic, non-migratory additive) from Ampacet Europe; active ZnO in PP; and active $TiO_2$ in PP.

EXAMPLES 1 TO 4

Masterbatches were prepared by compounding UV barrier additives in the powder state with polypropylene pellets using a PRISM twin screw extruder.

Plaques of polypropylene were produced with a Rondol multilayer extruder by mixing polypropylene granules and various UV barrier additives masterbatch. These plaques were then stretched using a TA long stretcher.

Gloss (45° angle), Wide angle haze were measured for each sample. The UV visible spectrum was acquired using a UV visible spectrophotometer and film thickness was determined to make necessary correction to take in account thickness variation. All UV graphs have been normalised to 25 μm thickness Accelerated ageing was also carried out by exposing samples to a 50° C. oven for 30 days in order to assess the stability of the final product.

Figure 1:
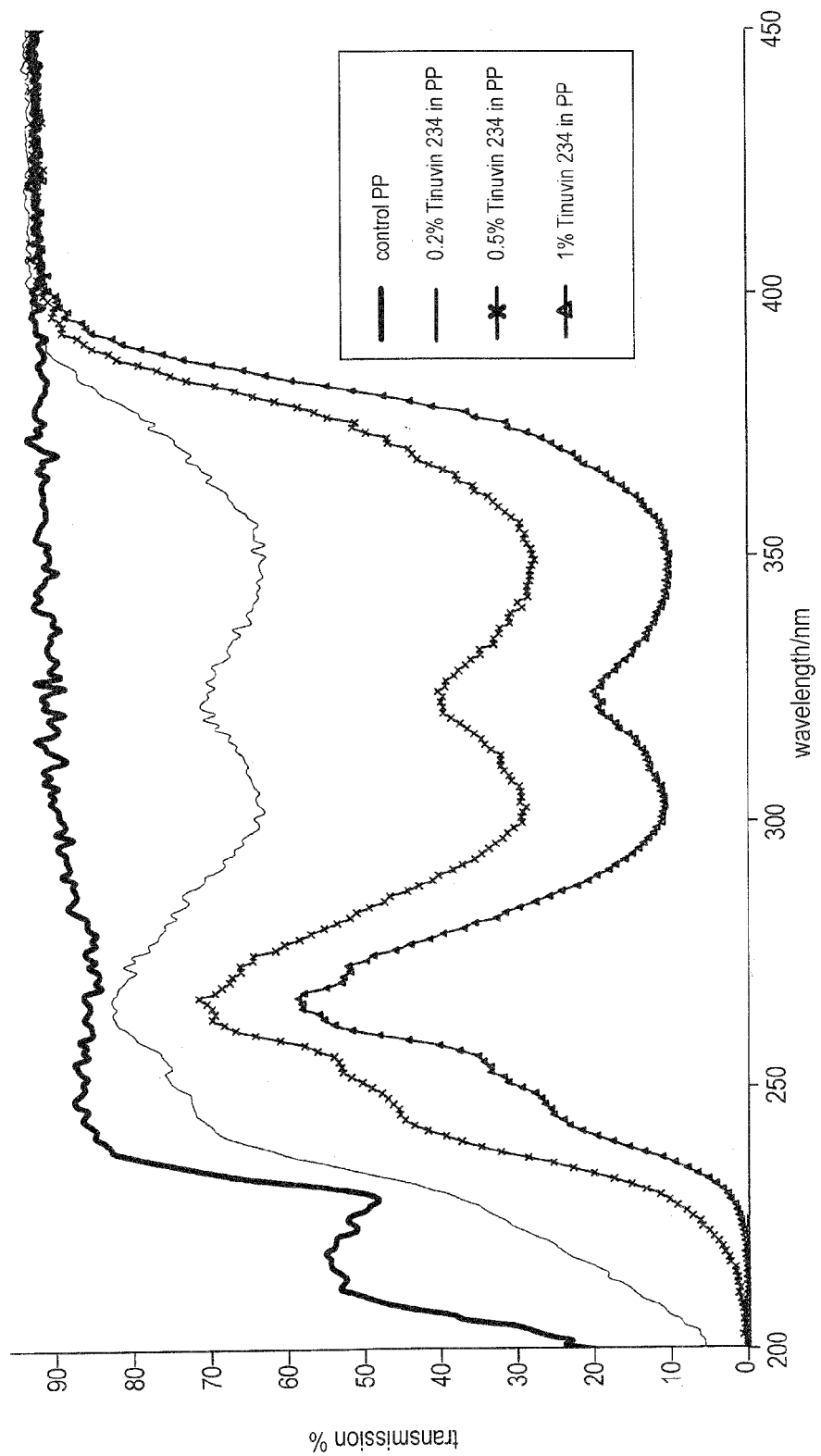
FIG. 1 depicts the UV spectra of Examples 1 to 4.

The results are shown in Table 1 and in FIG. 1.

TABLE 1

| Example | Sample | Gloss (%) | Wide Angle Haze (%) | Migration/ Blooming |
|---|---|---|---|---|
| 1 (comparative) | Control | 102.0 | 0.7 | n/a |
| 2 (comparative) | +0.2% Tinuvin 234 | 100.0 | 0.6 | No |
| 3 (comparative) | +0.5% Tinuvin 234 | 102.0 | 0.6 | No |
| 4 (comparative) | +1% Tinuvin 234 | 105.0 | 0.6 | Yes |

These results show the tendency of the organic additive to bloom to the surface of the film as the loading of the additive is increased.

EXAMPLES 5 TO 10

Figure 2:
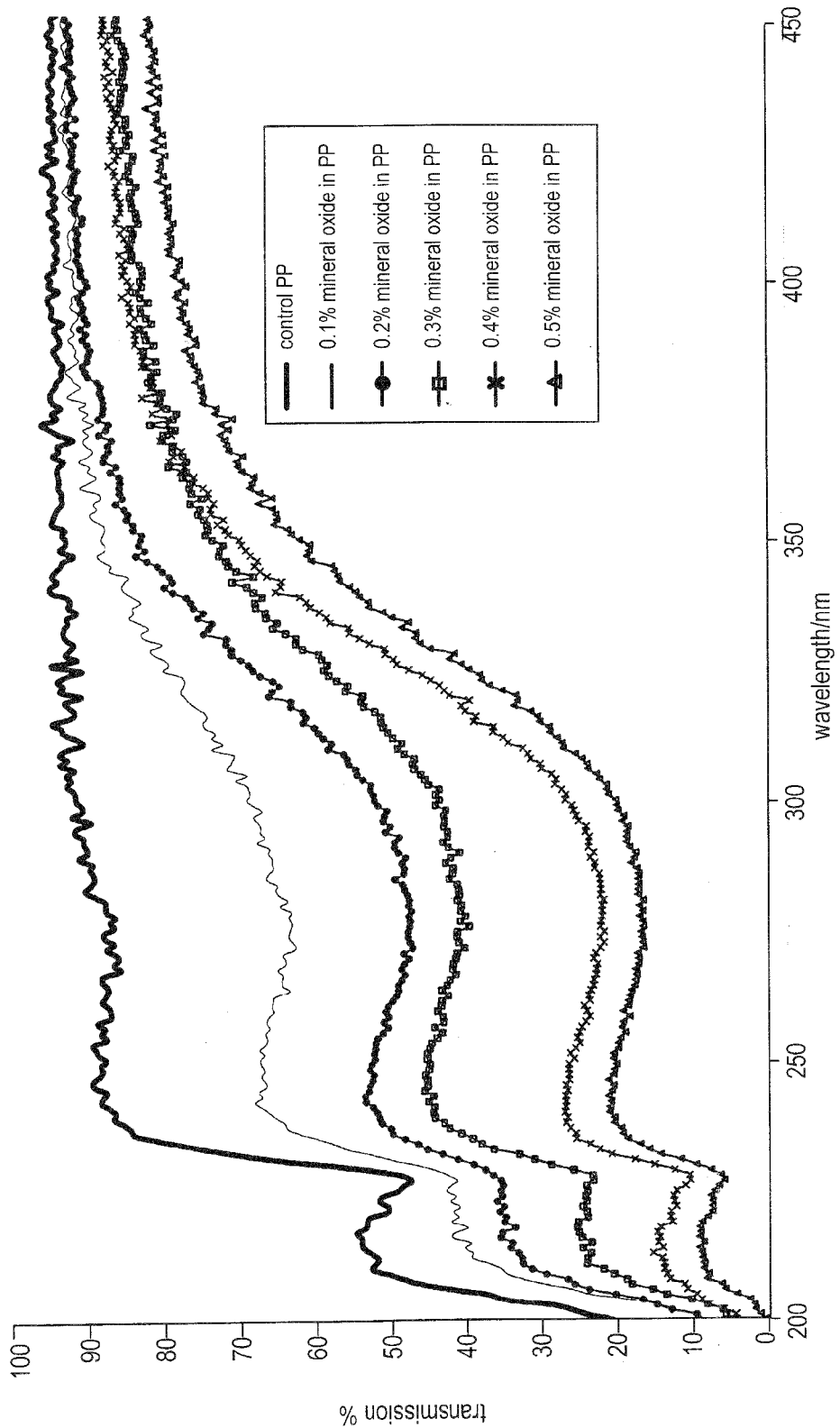
FIG. 2 depicts the UV spectra of Examples 5 to 10.

The samples were made up in the manner described for Examples 1 to 4, and the results are shown in Table 2 and in FIG. 2.

TABLE 2

| Example | Sample | Gloss (%) | Wide Angle Haze (%) | Migration/ Blooming |
|---|---|---|---|---|
| 5 (comparative) | Control | 102.0 | 0.7 | n/a |
| 6 (comparative) | +0.1% mineral oxide | 100 | 1.1 | No |
| 7 (comparative) | +0.2% mineral oxide | 98 | 2.6 | No |
| 8 (comparative) | +0.3% mineral oxide | 90 | 3.6 | No |
| 9 (comparative) | +0.4% mineral oxide | 96 | 4.7 | No |
| 10 (comparative) | +0.5% mineral oxide | 85 | 6.1 | No |

These comparative results show the tendency of a first type of inorganic additive to affect the optical properties of the film as the loading of the additive is increased.

EXAMPLES 11 TO 15

Figure 3:
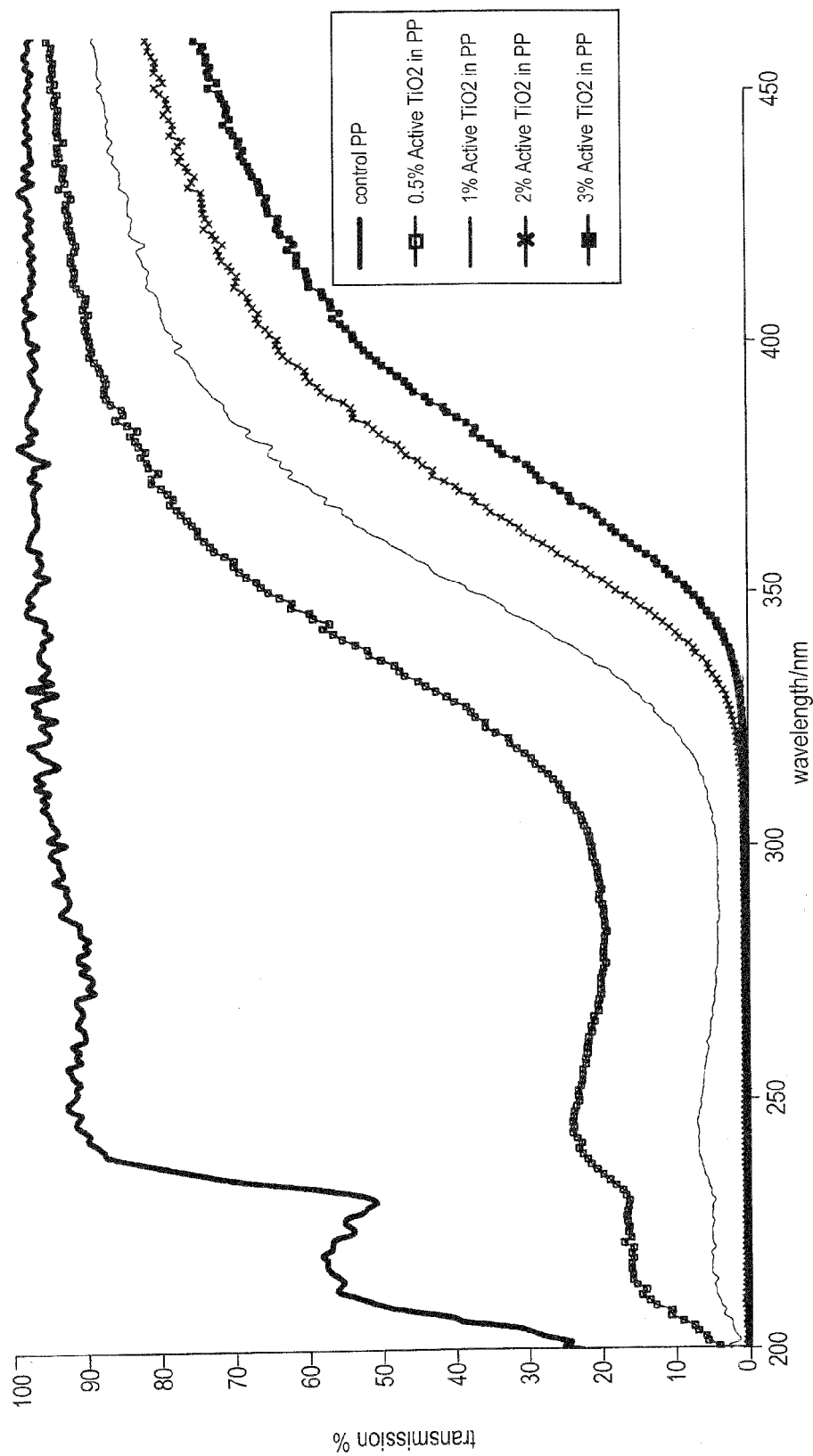
FIG. 3 depicts the UV spectra of Examples 11 to 15.

The samples were made up in the manner described for Examples 1 to 4, and the results are shown in Table 3 and in FIG. 3.

TABLE 3

| Example | Sample | Gloss (%) | Wide Angle Haze (%) | Migration/ Blooming |
|---|---|---|---|---|
| 11 (comparative) | Control | 102.0 | 0.7 | n/a |
| 12 (comparative) | +0.5% Active $TiO_2$ | 96 | 2.6 | No |
| 13 (comparative) | +1% Active $TiO_2$ | 95 | 2.4 | No |
| 14 (comparative) | +2% Active $TiO_2$ | 96 | 4.3 | No |

TABLE 3-continued

| Example | Sample | Gloss (%) | Wide Angle Haze (%) | Migration/ Blooming |
|---|---|---|---|---|
| 15 (comparative) | +3% Active $TiO_2$ | 90 | 5.8 | No |

These comparative results show the tendency of a second type of inorganic additive to affect the optical properties of the film as the loading of the additive is increased.

EXAMPLES 16 TO 20

Figure 4:
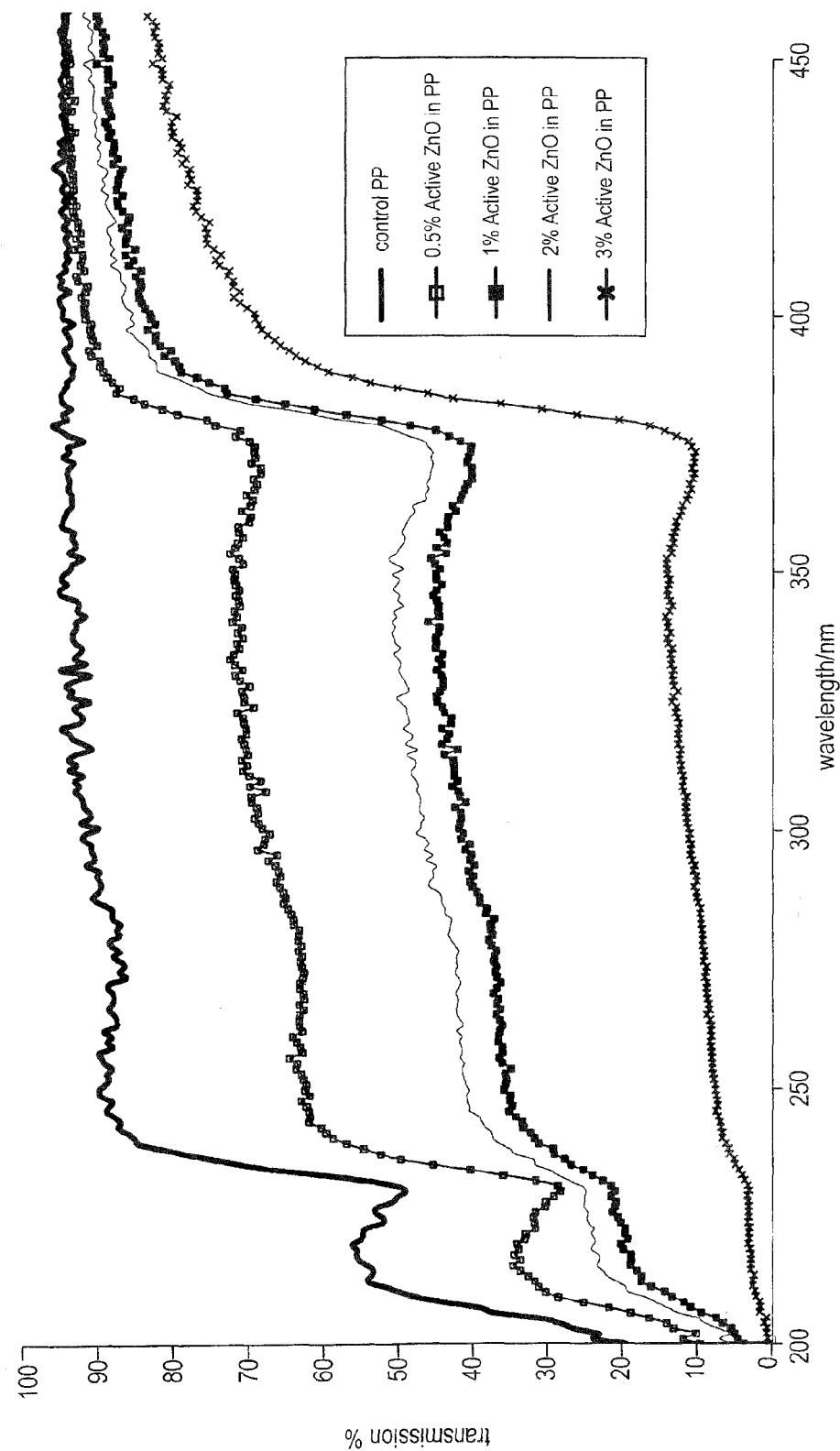
FIG. 4 depicts the UV spectra of Examples 16 to 20.
Figure 5:
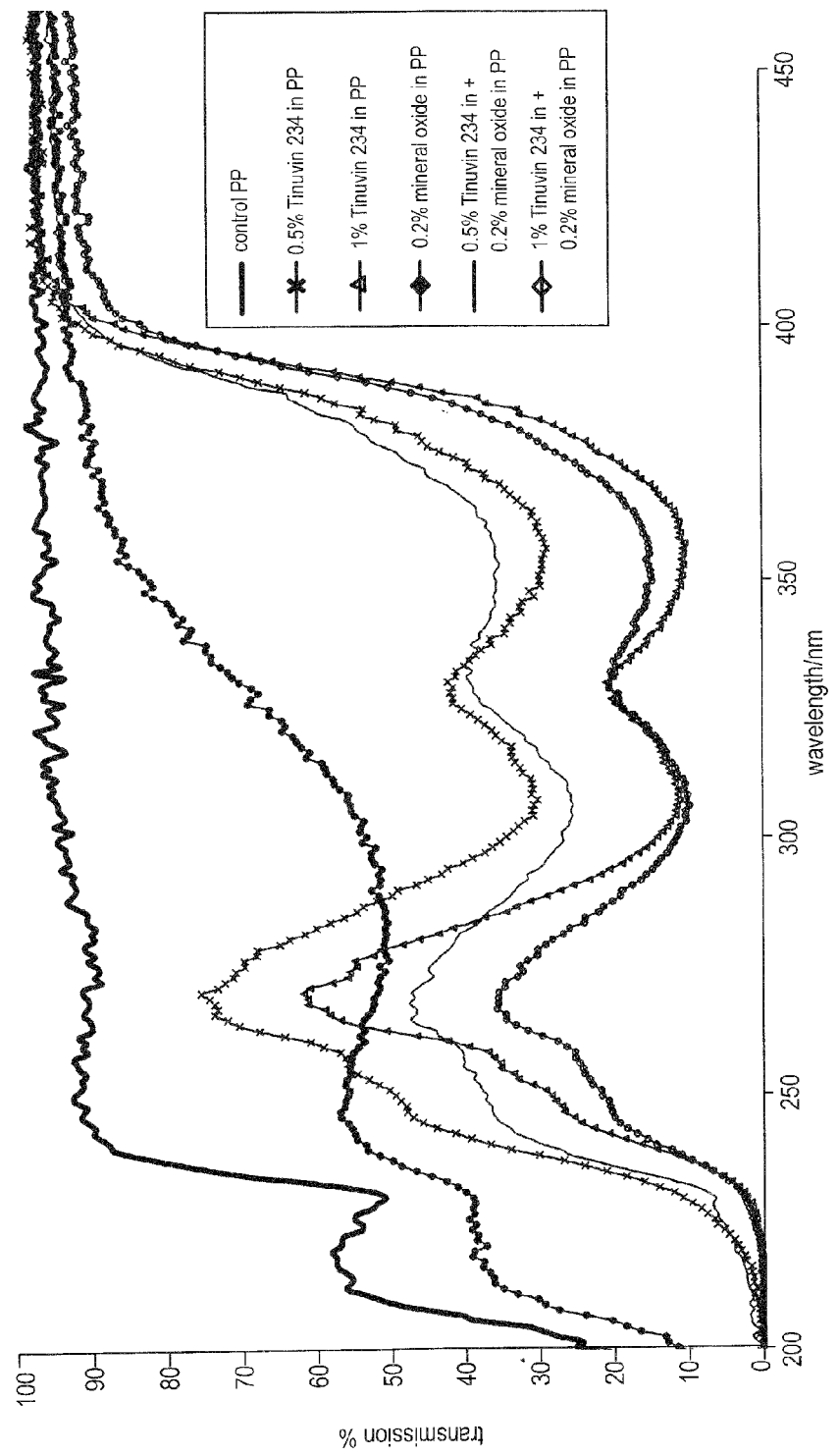
FIG. 5 depicts the UV spectra of Examples 21 to 26.

The samples were made up in the manner described for Examples 1 to 4, and the results are shown in Table 4 and in FIG. 4.

TABLE 4

| Example | Sample | Gloss (%) | Wide Angle Haze (%) | Migration/ Blooming |
|---|---|---|---|---|
| 16 (comparative) | Control | 102.0 | 0.7 | n/a |
| 17 (comparative) | +0.5% Active ZnO | 94 | 1.4 | No |
| 18 (comparative) | +1% Active Zno | 96 | 1.5 | No |
| 19 (comparative) | +2% Active ZnO | 100 | 2.2 | No |
| 20 (comparative) | +3% Active ZnO | 95 | 3.6 | No |

These comparative results show the tendency of a third type of inorganic additive to affect the optical properties of the film as the loading of the additive is increased.

TABLE 5

| Example | Sample | Gloss (%) | Wide Angle Haze (%) | Migration/ Blooming |
|---|---|---|---|---|
| 21 (comparative) | Control | 102.0 | 0.7 | n/a |
| 22 (comparative) | +0.5% Tinuvin 234 | 102.0 | 0.6 | No |
| 23 (comparative) | +1% Tinuvin 234 | 105.0 | 0.6 | Yes |
| 24 (comparative) | +0.2% mineral oxide | 98 | 2.6 | No |
| 25 | +0.5% Tinuvin 234 + 0.2% mineral oxide | 95 | 2.8 | No |
| 26 | +1% Tinuvin 234 + 0.2% mineral oxide | 95 | 2.6 | Yes |

EXAMPLES 27 TO 32

Figure 6:
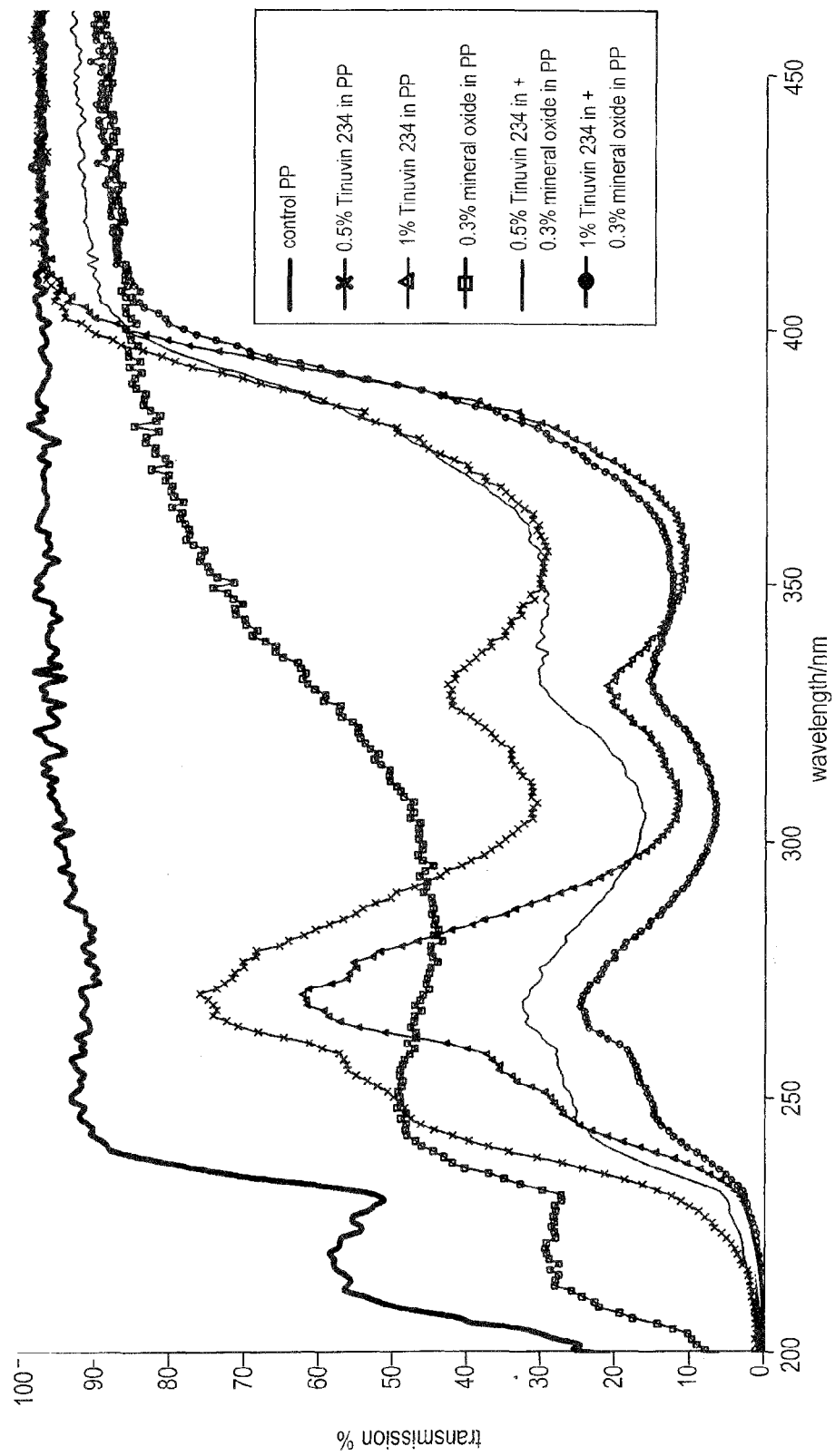
FIG. 6 depicts the UV spectra of Examples 27 to 32.

The samples were made up in the manner described for Examples 1 to 4, and the results are shown in Table 6 and in FIG. 6.

TABLE 6

| Example | Sample | Gloss (%) | Wide Angle Haze (%) | Migration/ Blooming |
|---|---|---|---|---|
| 27 (comparative) | Control | 102.0 | 0.7 | n/a |
| 28 (comparative) | +0.5% Tinuvin 234 | 102.0 | 0.6 | No |
| 29 (comparative) | +1% Tinuvin 234 | 105.0 | 0.6 | Yes |

TABLE 6-continued

| Example | Sample | Gloss (%) | Wide Angle Haze (%) | Migration/ Blooming |
|---|---|---|---|---|
| 30 (comparative) | +0.3% mineral oxide | 90 | 3.6 | No |
| 31 | +0.5% Tinuvin 234 + 0.3% mineral oxide | 95 | 3.7 | No |
| 32 | +1% Tinuvin 234 + 0.3% mineral oxide | 97 | 3.5 | Yes |

EXAMPLES 33 TO 38

Figure 7:
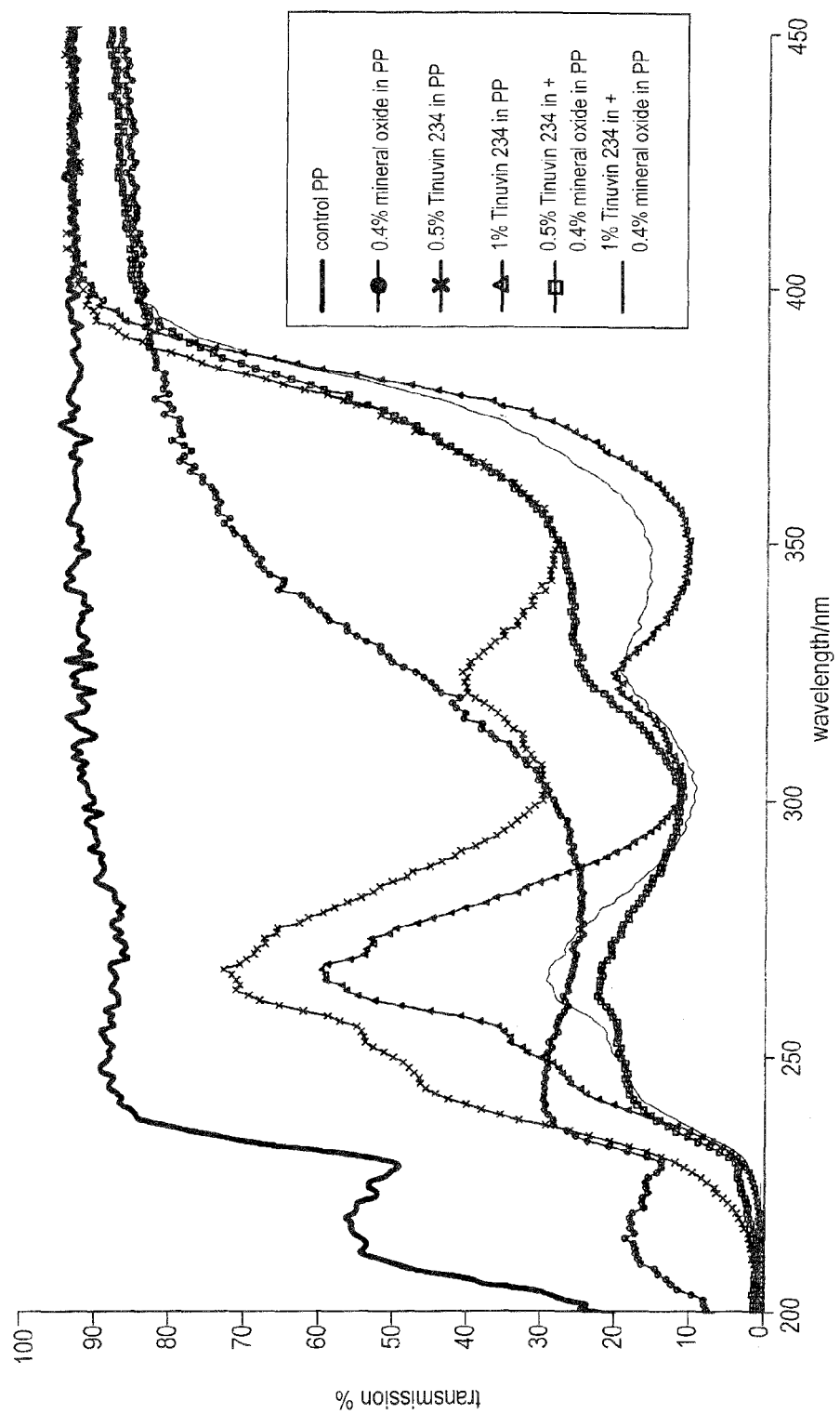
FIG. 7 depicts the UV spectra of Examples 33 to 38.

The samples were made up in the manner described for Examples 1 to 4, and the results are shown in Table 7 and in FIG. 7.

TABLE 7

| Example | Sample | Gloss (%) | Wide Angle Haze (%) | Migration/ Blooming |
|---|---|---|---|---|
| 33 (comparative) | Control | 102.0 | 0.7 | n/a |
| 34 (comparative) | +0.5% Tinuvin 234 | 102.0 | 0.6 | No |
| 35 (comparative) | +1% Tinuvin 234 | 105.0 | 0.6 | Yes |
| 36 (comparative) | +0.4% mineral oxide | 96 | 4.7 | No |
| 37 | +0.5% Tinuvin 234 + 0.4% mineral oxide | 94 | 4.8 | No |
| 38 | +1% Tinuvin 234 + 0.4% mineral oxide | 93 | 5.4 | Yes |

EXAMPLES 39 TO 44

Figure 8:
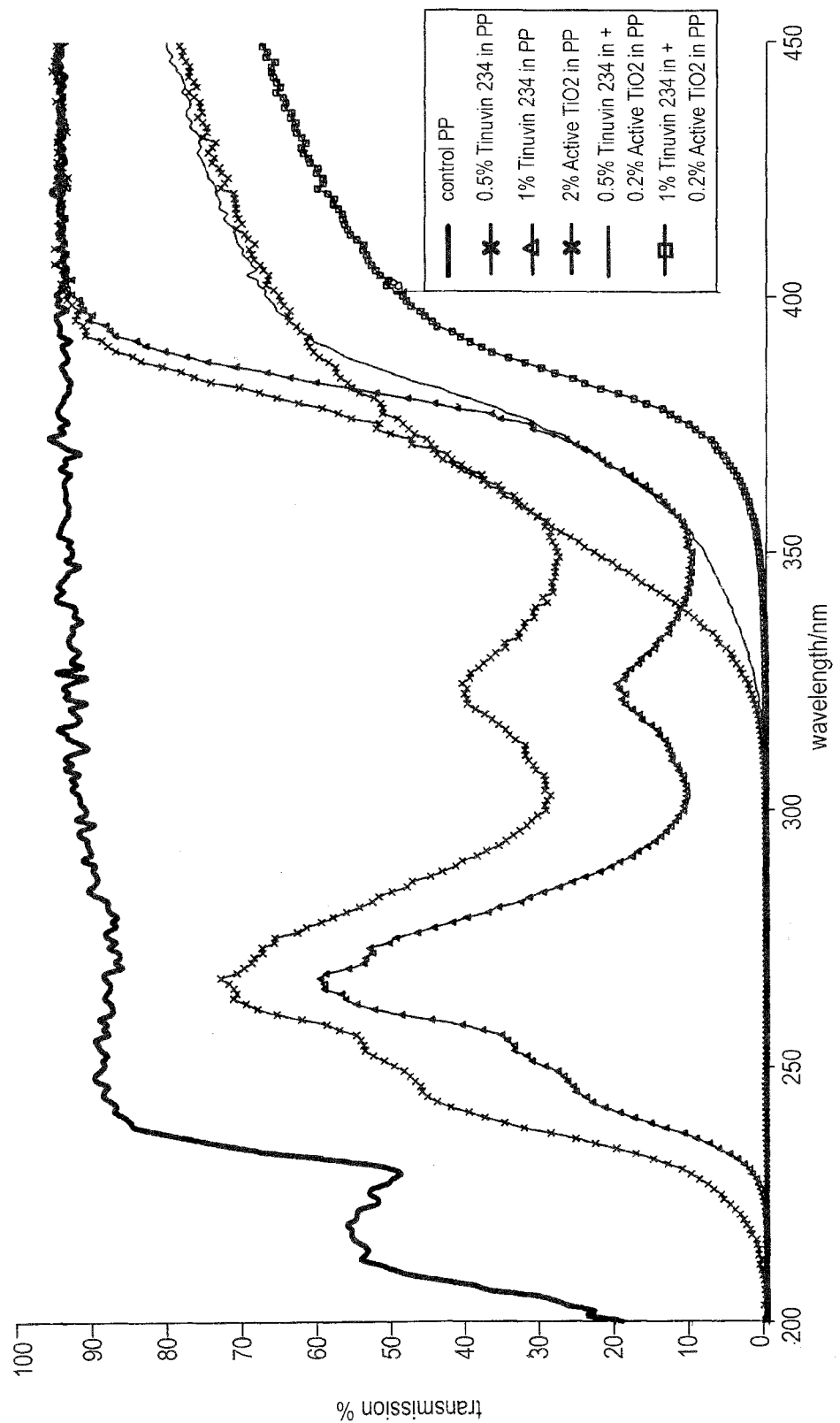
FIG. 8 depicts the UV spectra of Examples 39 to 44.

The samples were made up in the manner described for Examples 1 to 4, and the results are shown in Table 8 and in FIG. 8.

TABLE 8

| Example | Sample | Gloss (%) | Wide Angle Haze (%) | Migration/ Blooming |
|---|---|---|---|---|
| 39 (comparative) | Control | 102.0 | 0.7 | n/a |
| 40 (comparative) | +0.5% Tinuvin 234 | 102.0 | 0.6 | No |
| 41 (comparative) | +1% Tinuvin 234 | 105.0 | 0.6 | Yes |
| 42 (comparative) | +2% Active $TiO_2$ | 96 | 4.3 | No |
| 43 | +0.5% Tinuvin 234 + 2% Active $TiO_2$ | 90 | 4.8 | No |
| 44 | +1% Tinuvin 234 + 2% Active $TiO_2$ | 91 | 5.2 | Yes |

EXAMPLES 45 TO 50

Figure 9:
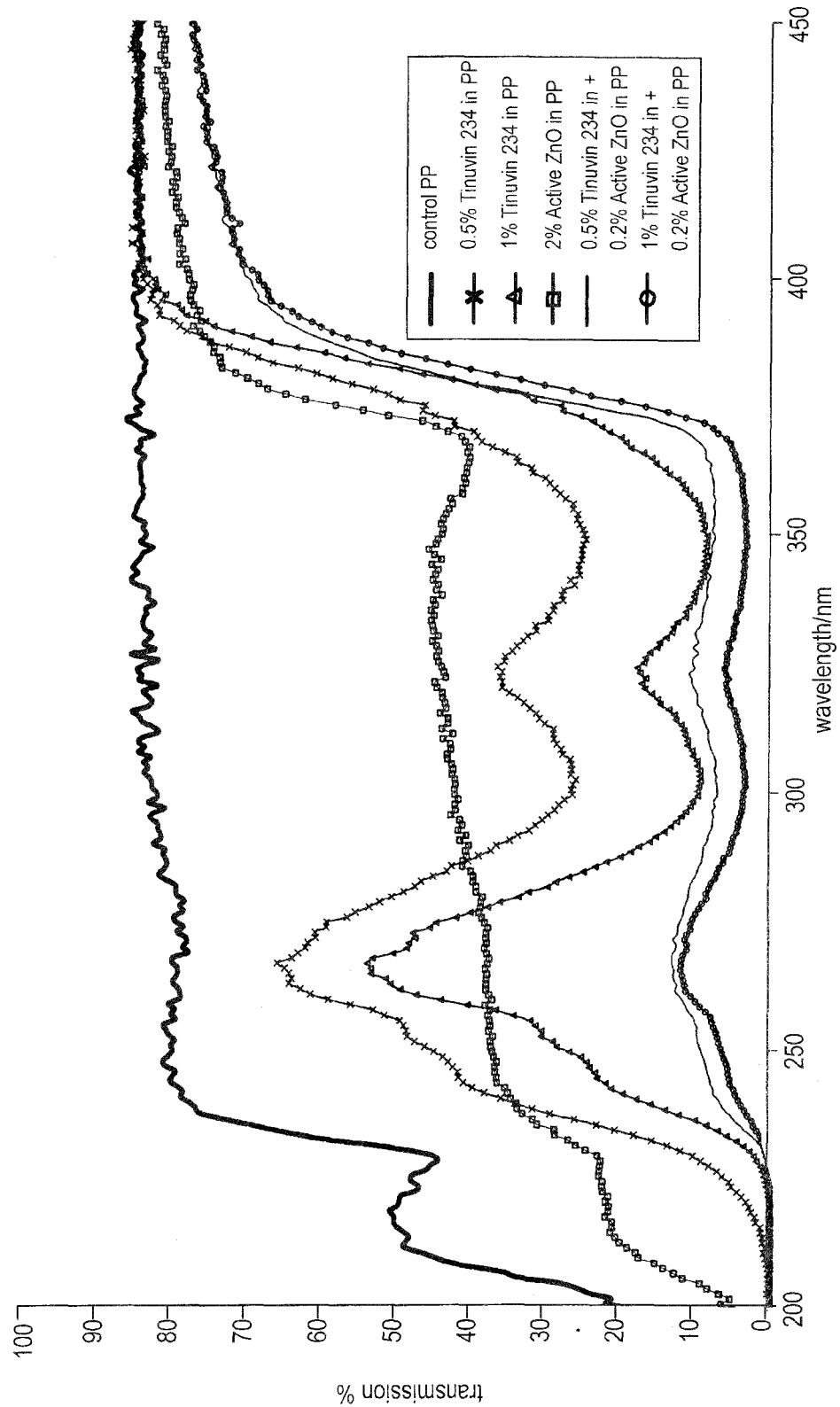
FIG. 9 depicts the UV spectra of Examples 45 to 50.

The samples were made up in the manner described for Examples 1 to 4, and the results are shown in Table 9 and in FIG. 9.

TABLE 9

| Example | Sample | Gloss (%) | Wide Angle Haze (%) | Migration/ Blooming |
|---|---|---|---|---|
| 45 (comparative) | Control | 102.0 | 0.7 | n/a |
| 46 (comparative) | +0.5% Tinuvin 234 | 102 | 0.6 | No |
| 47 (comparative) | +1% Tinuvin 234 | 105 | 0.6 | Yes |
| 48 (comparative) | +2% Active ZnO | 100 | 2.2 | No |
| 49 | +0.5% Tinuvin 234 + 2% Active ZnO | 96 | 2.6 | No |
| 50 | +1% Tinuvin 234 + 2% Active ZnO | 96 | 2.5 | Yes |

EXAMPLES 51 TO 56

Figure 10:
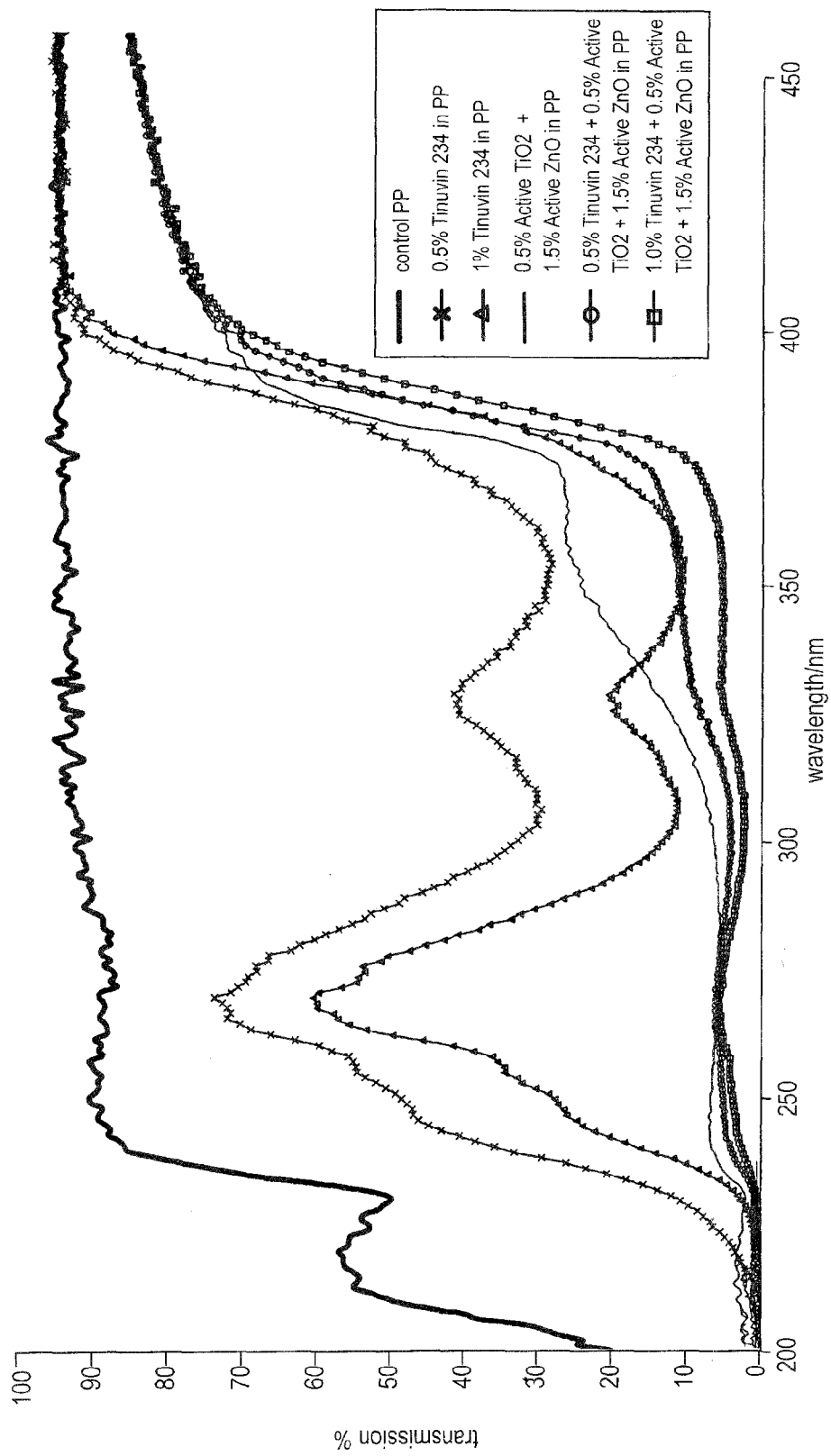
FIG. 10 depicts the UV spectra of Examples 51 to 56.

The samples were made up in the manner described for Examples 1 to 4, and the results are shown in Table 10 and in FIG. 10.

TABLE 10

| Example | Sample | Gloss (%) | Wide Angle Haze (%) | Migration/ Blooming |
|---|---|---|---|---|
| 51 (comparative) | Control | 102.0 | 0.7 | n/a |
| 52 (comparative) | +0.5% Tinuvin 234 | 102 | 0.6 | No |
| 53 (comparative) | +1% Tinuvin 234 | 105 | 0.6 | Yes |
| 54 (comparative) | +0.5% Active $TiO_2$ + 1.5% Active ZnO | 93 | 3.1 | No |
| 55 | +0.5% Tinuvin 234 + 0.5% Active $TiO_2$ + 1.5% Active ZnO | 93 | 3.3 | No |
| 56 | +1% Tinuvin 234 + 0.5% Active $TiO_2$ + 1.5% Active ZnO | 92 | 3.5 | yvs |

EXAMPLES 57 TO 62

Figure 11:
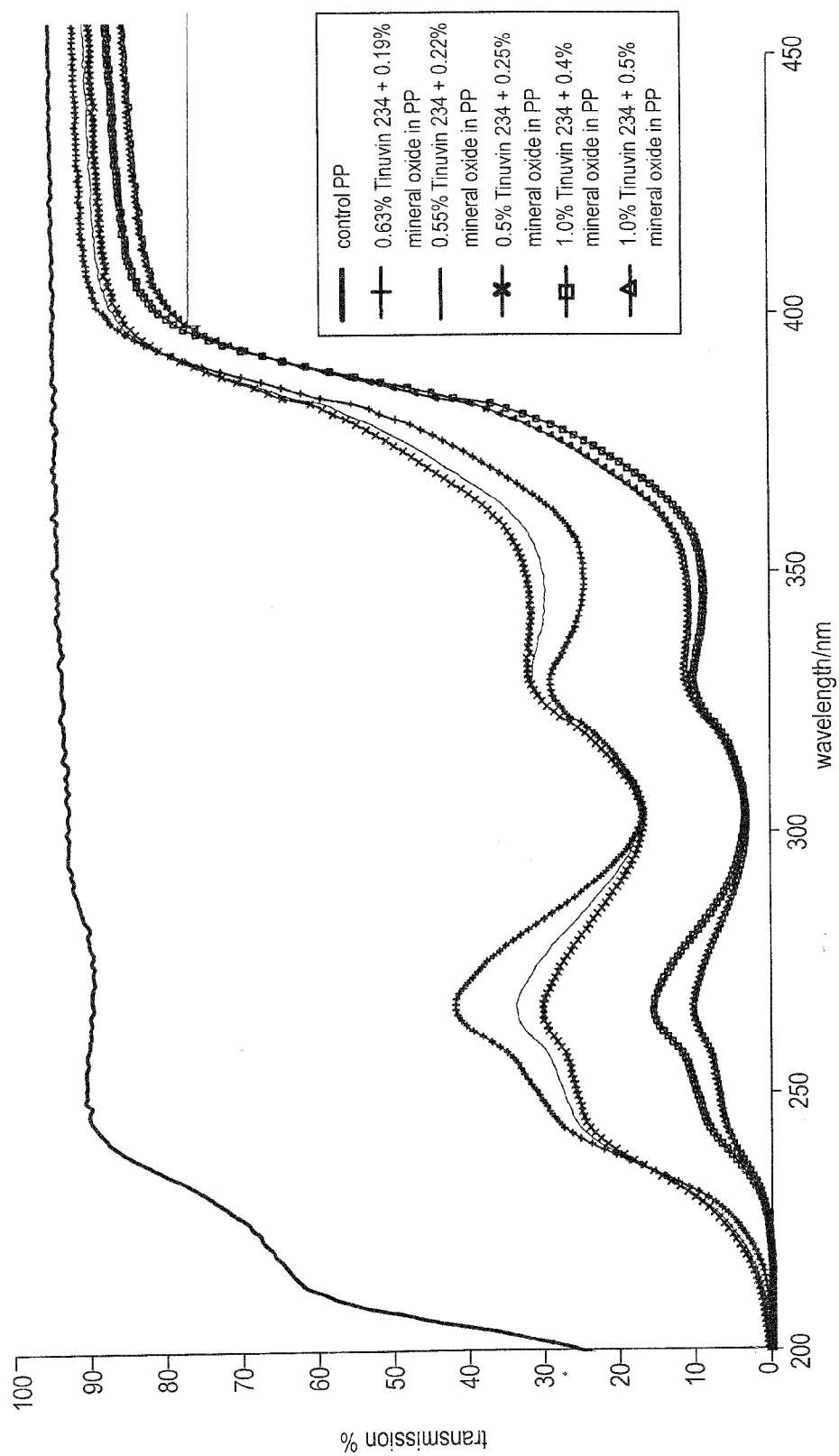
FIG. 11 depicts the UV spectra of Examples 57 to 62.

A three layer polymeric tube was formed by co-extruding a core layer of polypropylene homopolymer with two skin layers of polyethylene/polypropylene/polybutylene terpolymer (a random copolymer) on opposite sides of the core layer. UV additive masterbatch containing the selected UV additive was blended prior to extrusion with the polypropylene homopolymer in the core. The tube was cooled and subsequently reheated before being blown to produce a three layer biaxially oriented film tube. The blown film tube was spliced and cut to provide a three layer film of 23 µm thickness. The optical and UV transmittance properties of the films were measured and the results shown in Table 11 and in FIG. 11. All UV graphs have been normalised to 25 µm.

TABLE 11

| Example | Sample | Gloss (%) | Wide Angle Haze (%) | Migration/ Blooming |
|---|---|---|---|---|
| 57 (comparative) | Control | 92.1 | 1.9 | n/a |
| 58 | +0.63% Tinuvin 234 0.19% mineral oxide | 89.8 | 3.9 | n/r |
| 59 | +0.55% Tinuvin 234 + 0.22% mineral oxide | 87.7 | 4.7 | n/r |
| 60 | +0.5% Tinuvin 234 + 0.25% mineral oxide | 87.1 | 5.5 | n/r |

TABLE 11-continued

| Example | Sample | Gloss (%) | Wide Angle Haze (%) | Migration/ Blooming |
|---------|--------|-----------|---------------------|---------------------|
| 61 | +1% Tinuvin 234 + 0.4% mineral oxide | 85.7 | 6.7 | n/r |
| 62 | +1% Tinuvin 234 + 0.5% mineral oxide | 85.7 | 8.2 | n/r |

EXAMPLES 63 TO 68

Figure 12:
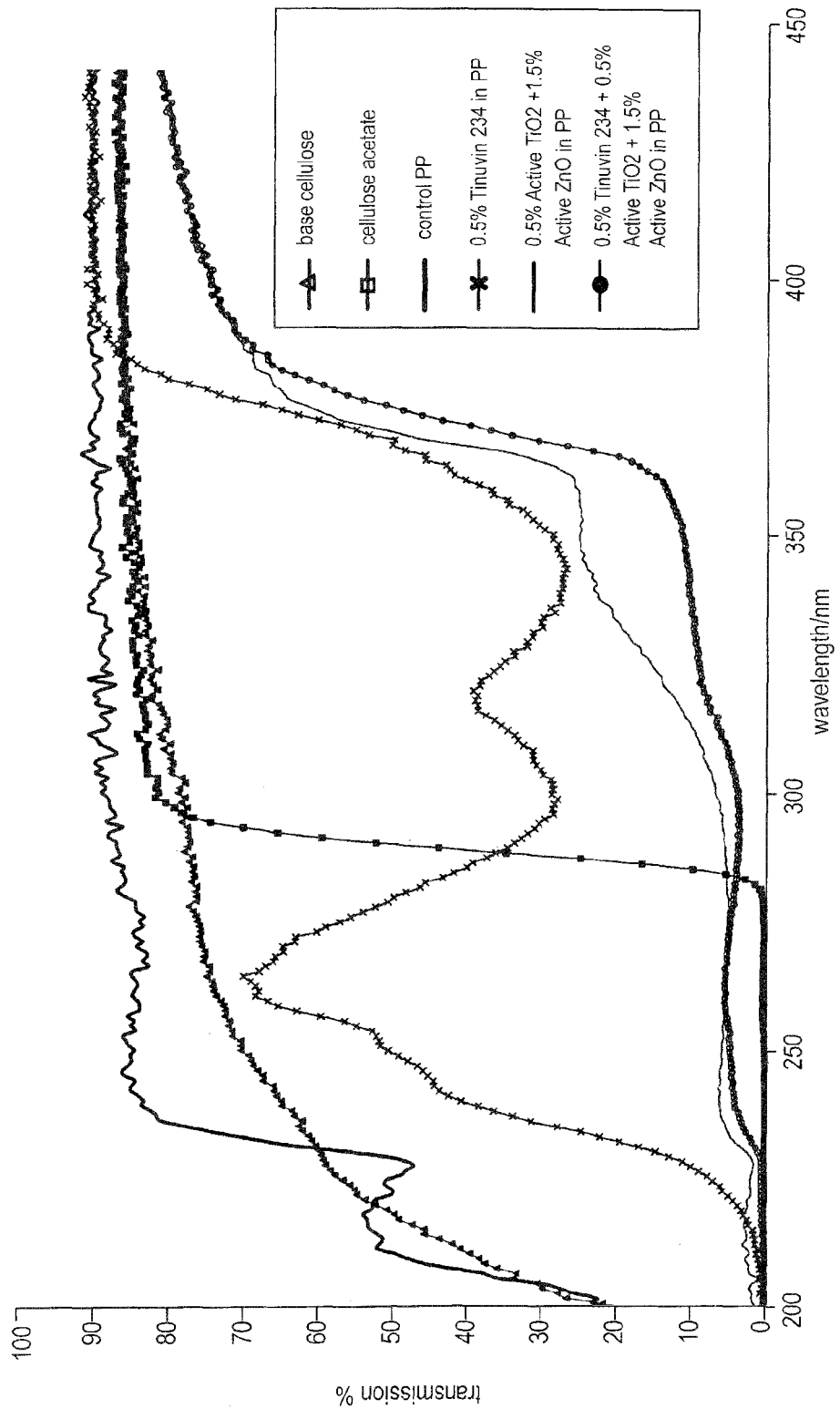
FIG. 12 depicts the UV spectra of Examples 63 to 68.

The UV spectra shown in FIG. 12 show the transmission profiles of one film in accordance with the invention (0.5% Tinuvin 234+0.5% Active $TiO_2$+1.5% Active ZnO in PP) compared with five comparative Examples (three being the same respectively as comparative Examples 52, 54 and 57 above, and two being different film types, namely commercially available cellulose and cellulose acetate films respectively).

What is claimed is:

1. A transparent polypropylene film comprising:
    at least a first and a second ultraviolet (UV)-absorbing additive;
    wherein said first additive comprises a non-aggregated inorganic material present in the film composition in an amount of from 0.1% to 5.0% by weight, and
    wherein said second additive comprises an organic material selected from the group consisting of triazines, hindered amines, oxanilides and cyanoacrylates;
    wherein said second additive is present in the film in an amount of less than 1.0% by weight,
    wherein the average particle size of the first additive is less than 100 nm.

2. A film according to claim 1 wherein the first additive comprises one or more compounds selected from the group consisting of: mineral and metal oxides.

3. A film according to claim 2 wherein the first additive comprises one or more compounds selected from the group consisting of: zinc and titanium oxides.

4. A film according to claim 1 formulated in the absence of any binder material for solubilizing the second additive.

5. A film according to claim 1 wherein the first additive is present in an amount below 4.5% by weight of the film composition.

6. A film according to claim 5 wherein the first additive is present in an amount below 3.5% by weight of the film composition.

7. A film according to claim 1 wherein at the point of maximum transmittance of UV light between 220 and 350 nm the film transmits no more than 30% of the UV light incident upon the film at the wavelength of the said maximum transmittance.

8. A film according to claim 1 further comprising benzotriazole and benzophenone, wherein the ratio of said benzotriazole to said benzophenone is at least 1:1.

9. A film according to claim 1 wherein benzophenone is absent in the film composition.

10. A film according to claim 1, wherein said film exhibits a wide angle haze (WAH) of less than 10%.

11. A film according to claim 1, wherein said film exhibits a gloss at a 45° angle of greater than 80%.

12. A film according to claim 1 further comprising benzotriazole and benzophenone, wherein the ratio of said benzotriazole to said benzophenone is greater than 0.5.

* * * * *